No. 688,980. Patented Dec. 17, 1901.
E. ZAHM.
MACHINE FOR MIXING LIQUIDS IN DEFINITE PROPORTIONS.
(Application filed Apr. 10, 1900.)
(No Model.) 2 Sheets—Sheet 1.
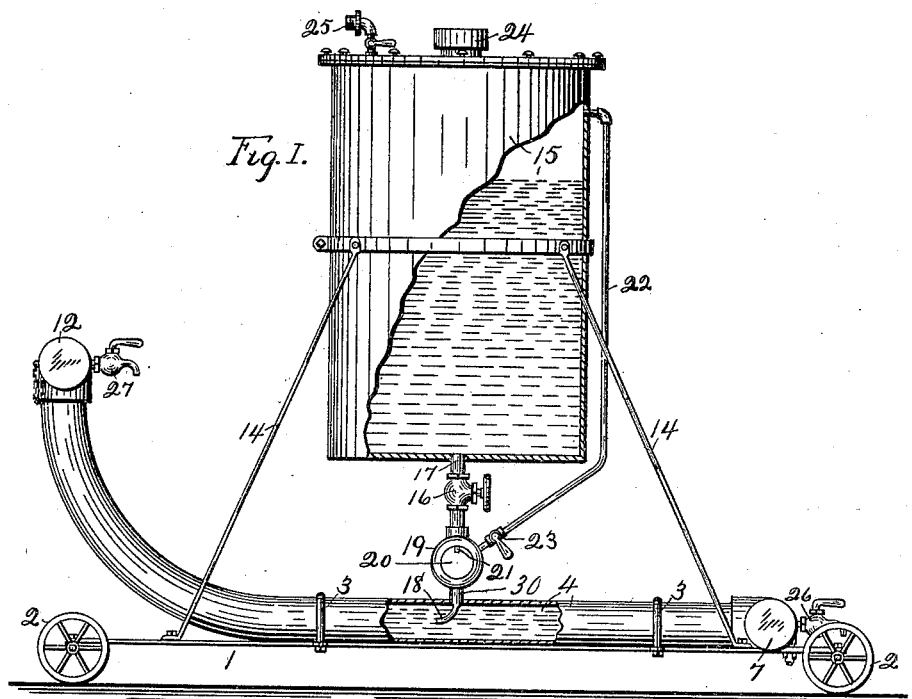
Fig. I.
Fig. II.
WITNESSES:
INVENTOR
Edward Zahm
BY
Alfred Wilkinson
ATTORNEY.

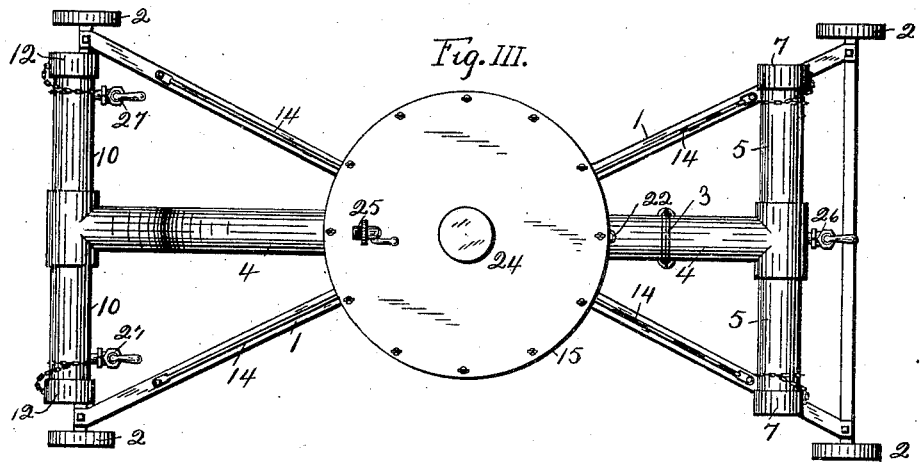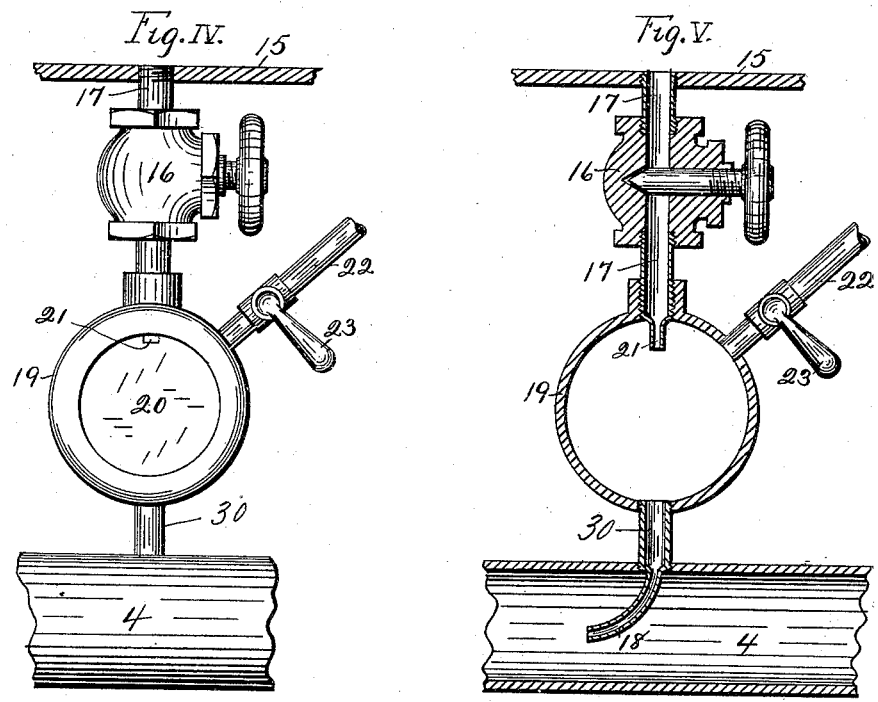

UNITED STATES PATENT OFFICE.

EDWARD ZAHM, OF SYRACUSE, NEW YORK.

MACHINE FOR MIXING LIQUIDS IN DEFINITE PROPORTIONS.

SPECIFICATION forming part of Letters Patent No. 688,980, dated December 17, 1901.

Application filed April 10, 1900. Serial No. 12,340. (No model.)

*To all whom it may concern:*

Be it known that I, EDWARD ZAHM, of Syracuse, in the county of Onondaga, in the State of New York, have invented new and useful Improvements in Machines for Mixing Liquids in Definite Proportions, of which the following, taken in connection with the accompanying drawings, is a full, clear, and exact description.

My invention relates to a machine for adding a limited amount of one liquid in definite proportions to a second liquid, so that the two shall be thoroughly mixed.

My invention may be applied to different uses, such as adding an antiseptic solution to another liquid; but I have here shown it in a form particularly adapted for coloring beer, in which it is important that the different brews should always be of the same color and that the color should be uniformly distributed throughout. Extract of roasted malt is used and has heretofore been added to the beer in the vat, cask, or barrel, natural diffusion being depended upon to distribute it throughout the beer, not successfully, for the beer drawn from different parts of the cask shows variation in color. In my invention the coloring-matter is added gradually to the beer flowing through a pipe at any stage of its manufacture, so that, the rate of its flow being known, the coloring solution is uniformly added and thoroughly incorporated therewith.

The machine therefor consists, essentially, of a main pipe for the passage of the beer or other liquid in considerable quantities and a reservoir connected thereto by a small tube for feeding uniformly the coloring, antiseptic, or other solution to the main liquid. This solution may be delivered into the main liquid by gravity or other desirable force.

My invention will be understood by reference to the accompanying drawings, in which the same reference-numerals indicate the same parts in the figures.

Figure I is a side elevation of my machine, portions being broken away and shown in section. Fig. II is an end elevation thereof, taken at right angles to the preceding. Fig. III is a top plan view. Fig. IV is an enlarged elevation of communications between reservoir and main flow-pipe. Fig. V is a vertical section of Fig. IV.

In the figures, 1 indicates the base, of any suitable construction, provided with wheels 2 2, to which is secured by straps 3 3 or otherwise the main pipe 4 for the beer, having inlet branches 5 5, with inlets 6 at their ends for attachment of hose, or which may be closed by caps 7 7. The outlet end of the pipe is preferably bent up the better to mix the liquids and has outlet branches 10 10, having outlets 11, to which hose or pipe may be attached, or may be closed by caps 12 12. On the base is supported by frame 14 14 the reservoir 15, containing the coloring solution, which flows through the outlet-tube 17, provided with a suitable regulating-valve, as pin-valve 16, and is delivered into the main pipe through lower tube 30 and tip 18, preferably curved in the direction of the flow of the beer to insure the free flow of the solution. Between this outlet-tube and the delivery-tip is arranged a small chamber 19, having a glass front 20, which forms a sight-feed, so that the flow of the coloring solution through straight tip 21 may be seen. A gage might be used accurately to measure the flow of the solution; but in most cases this may be judged with sufficient accuracy by observation. Pipe 22, provided with valve 23, leads from this chamber to the reservoir above the solution to equalize the pressure and force back beer which might rise in the curved tip and the chamber.

24 is an opening for the introduction of the solution, and 25 the air-pressure cock to equalize the pressure in the reservoir with that of the flowing beer 26, and 27 27 are test-cocks to test the beer as to color respectively before and after solution has been added.

The pressure on the solution in the reservoir and in the chamber must be at least as great as that on the beer that the solution may drop straight through the chamber to the lower tube and tip and that the beer may not back up therein.

Having thus fully described my invention, what I claim, and desire to secure by Letters Patent, is—

1. In combination in a machine for adding uniformly to a larger quantity of one liquid, a smaller quantity of a second, a main pipe for the flow of the first liquid formed with inlets and outlets, a reservoir supported adjacent thereto and a small tube connecting said reservoir with said main flow-pipe and means for feeding the liquids continuously into the main pipe.

2. In combination in a machine for adding uniformly to a larger quantity of one liquid, a smaller quantity of a second, a suitable base, a main pipe supported thereon with inlets and outlets for the main liquid, a reservoir for the second liquid also supported on the base and a small tube curved in the direction of the flow of the main liquid connecting the reservoir with the main pipe.

3. In combination in a machine for coloring beer, a main pipe for the flow of the beer with one or more inlets and outlets, supply-tubes and outlet-tubes adapted to be connected thereto, a reservoir for the coloring solution supported on the base above said main pipe, a small tube connecting the bottom of said reservoir with the main pipe, said tube being formed with an enlarged portion or chamber having a transparent face, between said reservoir and main tube, for observing the flow of the solution.

4. In combination in a machine for coloring beer, a suitable base, a main pipe for the flow of the beer formed with one or more inlets and outlets, a reservoir for the coloring solution sustained above said main pipe, a small chamber having a transparent face arranged between the reservoir and the main pipe, a tube connecting the reservoir to said chamber and terminating in said chamber in a tip visible through said transparent face and a tube connecting the bottom of said chamber with the main pipe.

5. In combination in a machine for coloring beer, a suitable base, a main pipe for the flow of the beer formed with one or more inlets and outlets, a reservoir for the coloring solution sustained above said main pipe, a small chamber having a transparent face arranged between the reservoir and the main pipe, a tube connecting the reservoir to said chamber and terminating in said chamber in a tip visible through said transparent face, a tube connecting the bottom of said chamber with the main pipe, and an air-pressure pipe connecting said chamber with the upper portion of the reservoir.

6. In combination in a machine for adding coloring-matter to beer, a suitable base, a main pipe supported thereon for the flow of the beer formed with inlets and outlets, its outlet end being elevated, a reservoir for the coloring solution supported on the base, above the main pipe, a chamber arranged between said reservoir and main pipe having a transparent face, a tube provided with a valve connecting the bottom of the reservoir with the top of said chamber and terminating within the chamber in a small tip visible through said face, and a tube connecting the bottom of the chamber with the main pipe and terminating within said main pipe in a tip curved in the direction of the flow of the beer.

In testimony whereof I have hereunto signed my name.

EDWARD ZAHM. [L. S.]

Witnesses:
C. C. SCHOENECK,
M. T. BROWNELL.